United States Patent [19]

Knop et al.

[11] Patent Number: 4,617,051

[45] Date of Patent: * Oct. 14, 1986

[54] METHOD OF OPERATING A REACTOR FOR SYNTHESIS GAS PRODUCTION

[75] Inventors: Klaus Knop, Bottrop; Peter Heinrich, Oberhausen, both of Fed. Rep. of Germany

[73] Assignee: M.A.N. Maschinenfabrik Augsburg-Nürnberg Aktiengesellschaft, Fed. Rep. of Germany

[*] Notice: The portion of the term of this patent subsequent to Dec. 3, 2002 has been disclaimed.

[21] Appl. No.: 505,330

[22] Filed: Jun. 17, 1983

[30] Foreign Application Priority Data

Jun. 25, 1982 [DE] Fed. Rep. of Germany ....... 3223702

[51] Int. Cl.$^4$ ............................ C22B 5/12; C10J 3/46
[52] U.S. Cl. ..................................... 75/91; 48/197 R; 75/35; 252/373
[58] Field of Search ................. 48/212, 213, 210, 203, 48/197 R, 196 R; 252/373; 75/35, 90 R, 90 HP, 91

[56] References Cited

U.S. PATENT DOCUMENTS

| 2,113,774 | 4/1938 | Schmalfeldt | 48/210 |
| 4,011,058 | 3/1977 | Johnson et al. | 48/210 |
| 4,235,624 | 11/1980 | Wagener et al. | 48/197 R X |

FOREIGN PATENT DOCUMENTS

| 2257733 | 5/1973 | Fed. Rep. of Germany | 252/373 |
| 3103933 | 1/1982 | Fed. Rep. of Germany | |
| 3111030 | 2/1982 | Fed. Rep. of Germany | |
| 52-41607 | 3/1977 | Japan | 252/373 |
| 799551 | 8/1958 | United Kingdom | 75/35 |
| 508527 | 6/1976 | U.S.S.R. | 252/373 |

Primary Examiner—Barry S. Richman
Assistant Examiner—Joye L. Woodard
Attorney, Agent, or Firm—McGlew and Tuttle

[57] ABSTRACT

A method for operating a reactor for producing synthesis gas, wherein, after gas treatment, a part of the waste heat of the gas production is recycled by subjecting the fly ash-free, cooled synthesis gas to a high-temperature conversion, cooling it again, compressing it, scrubbing it and reheating it, and returning it after partial oxidation into the continuous process.

3 Claims, 2 Drawing Figures

METHOD OF OPERATING A REACTOR FOR SYNTHESIS GAS PRODUCTION

FIELD AND BACKGROUND OF THE INVENTION

The present invention relates in general to the production of synthesis gas, and in particular to a new and useful method of utilizing waste heat produced in the subsequent treating of raw reactor gas to produce the synthesis gas.

Synthesis gas is a mixture of gases which result from a reaction of carbon-rich substances with steam or with steam and oxygen. Synthesis gas contains chiefly carbon monoxide and hydrogen.

Various methods of operating reactors for producing synthesis gas are known, providing a later use of the synthesis gas for direct deoxidation, ammonia production, or other chemical processes.

Prior art methods, as a rule, provide cracking, enrichment, or other treatments of natural gas, coal gasification gas, or coke oven gas. These methods, which are very numerous, are disadvantageous in that their efficiency is relatively low and they require a great amount of energy to be supplied through the basic materials.

SUMMARY OF THE INVENTION

The present invention is directed to an improved method of the above mentioned kind which however, achieves an optimum efficiency, employs even coal dust as the basic material for supplying energy.

Accordingly an object of the present invention is to provide a method of operating a reactor for producing synthesis gas which comprises supplying carbon containing material to the reactor, supplying oxygen containing gas to the reactor to produce a raw reactor gas, subsequently treating the raw reactor gas to produce treated reactor gas, heating a portion of the treated reactor gas using heat from the raw reactor gas and returning the portion of the treated reactor gas to the reactor.

It is advantageous to provide two alternatives of the method. In the first alternative, the reactor gas which is freed from ash and cooled, is subjected to a high-temperature conversion, then again cooled, compressed and scrubbed, with a partial stream being oxidized, reheated and then supplied to the reactor along with combustion air and the carbon-containing material to be combusted. According to the other alternative, the cooled reactor gas stream which is branched off and freed from fly ash is loaded with steam, converted and after compression, heated and returned to the reactor along with the combustion air and the carbon-containing material to be combusted.

Another object of the invention is to provide a method wherein the portion of the treated reactor gas forming a partial stream of the gas is cooled and passed through a gas scrubber and discharged as carburated fuel gas.

A still further object of the invention is to provide such a method wherein non-converted carbon is recycled to the reactor with ash or fly ash from the reactor.

A still further object of the invention is to provide an apparatus for practicing the method.

An apparatus for carrying out the inventive method advantageously comprises a waste heat exchanger for heating the circuit gas after the gas has been treated, which is provided between the reactor and the gas treating equipment.

A further object of the invention is to provide an apparatus for utilizing waste heat in reactor gas from a reactor producing synthesis gas which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, two embodiments of the invention are described in more detail with reference to the accompanying drawings in which.

DESCRIPTION OF THE PREFERRED EMBODIMENTS

Figure 1:
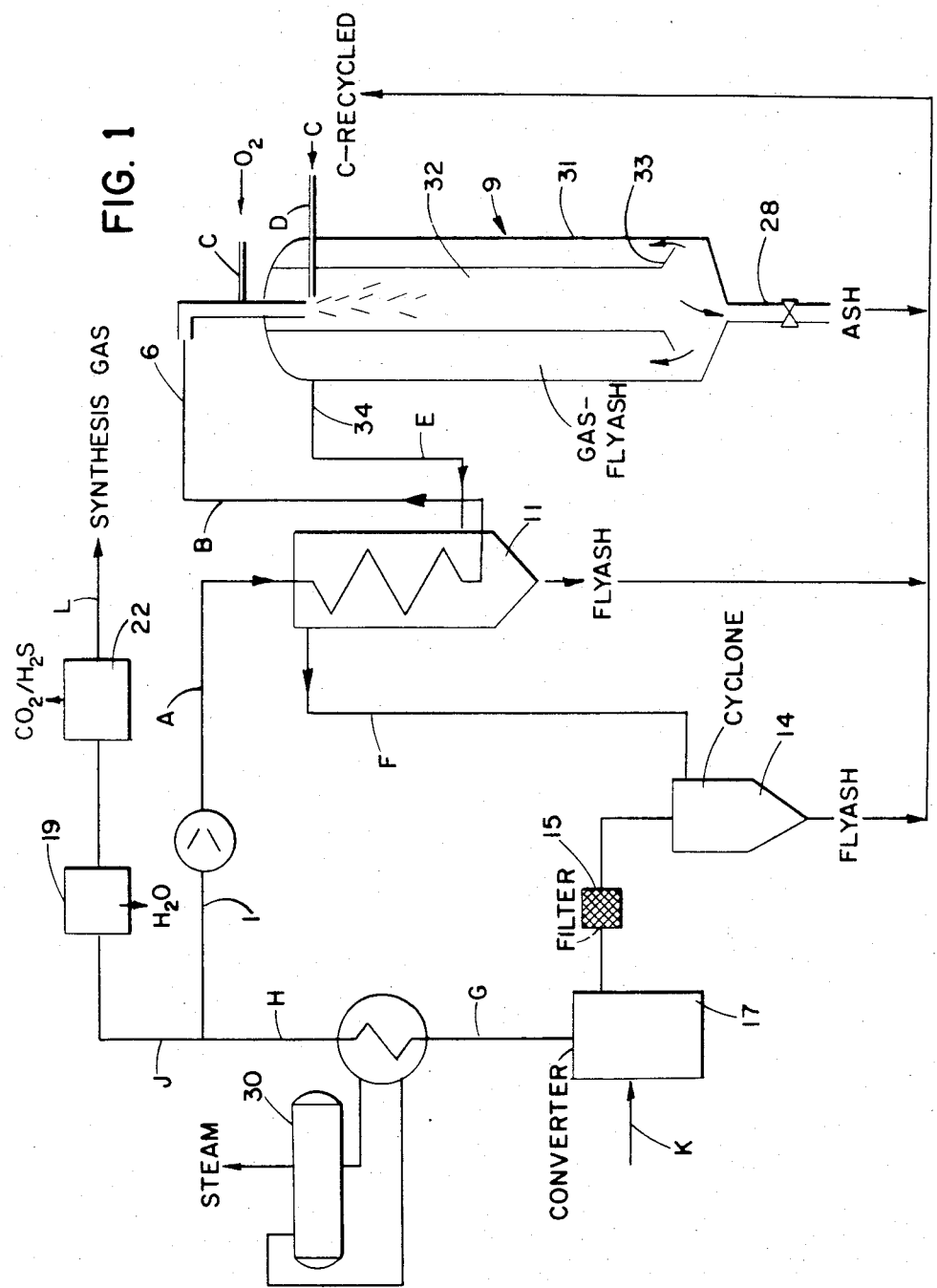
FIG. 1 is a flow diagram of a plant for producing carburated or synthesis gas.
Figure 2:
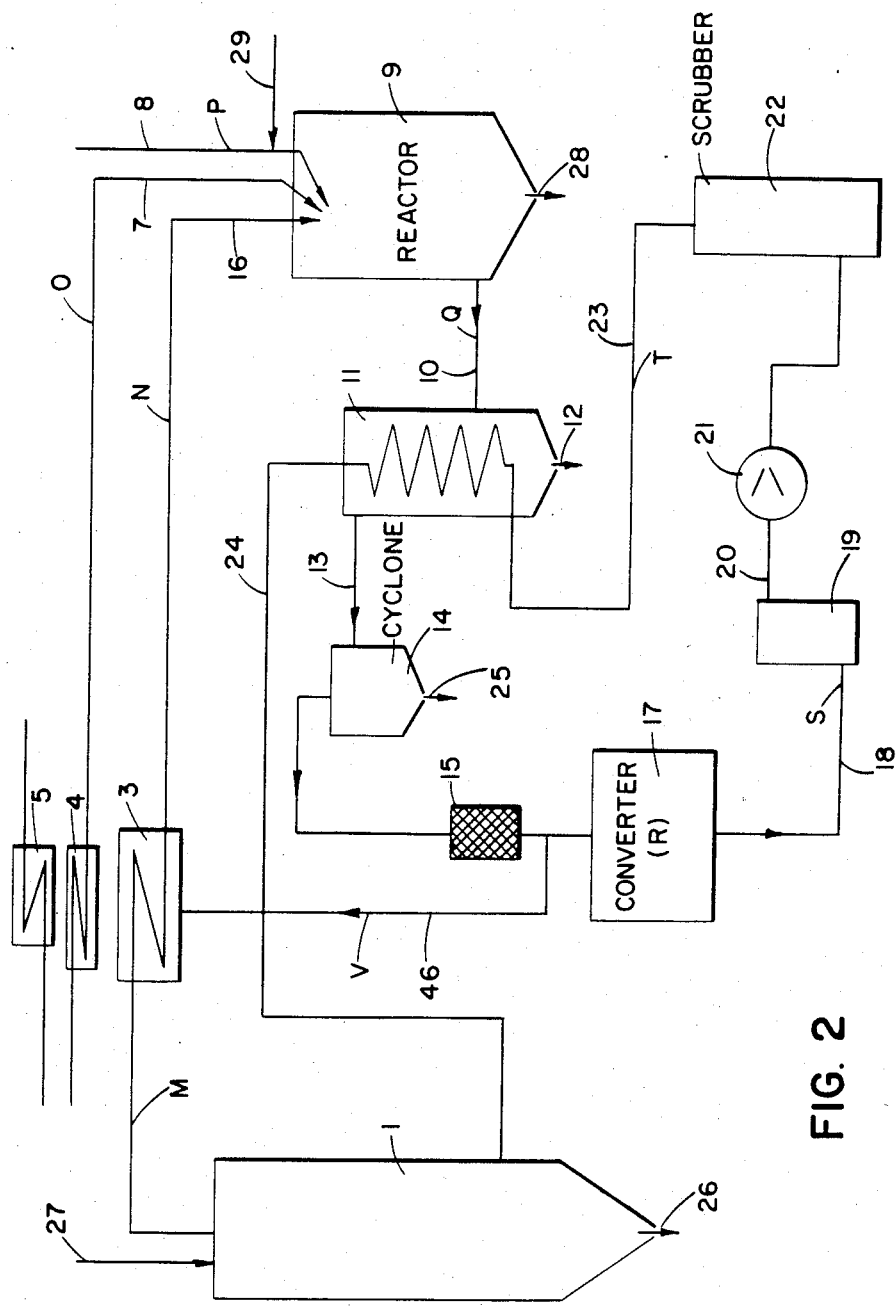
FIG. 2 is a similar diagram of a plant for producing synthese gas to be used in a reduction reactor.

Reference is now made to the attached drawings and Tables I and II. In FIGS. 1 and 2 of the drawings, the same numerals or letters are utilized to designate similar structures. In the Tables, letters are utilized to designate different conditions and compositions of gases in the structures of FIGS. 1 and 2 bearing the same letters. These letters are utilized in those figures to designate the conditions at various points.

TABLE I

| | A | B | C | D | E | F | G | H | I | J | K | L |
|---|---|---|---|---|---|---|---|---|---|---|---|---|
| $H_2$ (%) | 42.67 | 42.67 | | | 33.71 | 33.71 | 42.67 | 42.67 | 42.67 | 42.67 | | 54.14 |
| CO (%) | 29.52 | 29.52 | | | 54.54 | 54.54 | 29.52 | 29.52 | 29.52 | 29.52 | | 37.53 |
| $CO_2$ (%) | 19.81 | 19.81 | | | 5.89 | 5.89 | 19.81 | 19.81 | 19.81 | 19.81 | | 3.0 |
| $H_2O$ (%) | 7.74 | 7.74 | | | 5.57 | 5.57 | 7.74 | 7.74 | 7.74 | 7.74 | 100.0 | 5.0 |
| $CH_4$ (%) | 0.18 | 0.18 | | | 0.22 | 0.22 | 0.18 | 0.18 | 0.18 | 0.18 | | 0.23 |
| $N_2$ (%) | 0.07 | 0.07 | | | 0.05 | 0.05 | 0.07 | 0.07 | 0.07 | 0.07 | | 0.06 |
| M ($Nm^3$) | 2000 | 2000 | | | 2556 | 2556 | 3127 | 3127 | 2000 | 1127 | 571 | 886 |
| T (°C.) | 180 | 950 | 400 | 20 | 960 | 310 | 400 | 150 | 150 | 150 | | 55 |
| P (bar) | 0 | 5.3 | 6.0 | 6.0 | 5.0 | 4.5 | 4.0 | 3.5 | 3.5 | 3.5 | | 3.0 |
| C (kg) | — | — | | 300 | — | | | | | | | |
| $O_2$ ($Nm^3$) | — | — | 150 | — | — | | | | | | | |

| | | System |
|---|---|---|
| Theoretical yield | 2953 $Nm^3$ Synthesis gas/tc | 1800 |
| | 2067 $Nm^3$ Synthesis gas/metr. tons of coal | 1300 |
| $O_2$ input | 169 $Nm^3$ /1000 $Nm^3$ Synthesis gas | 306 |
| stream | — (0.5 t/1000 $Nm^3$ Synthesis gas | 128 |

TABLE I-continued

| for CO₂ scrubber) | (without conversion and CO₂ scrubber) |
|---|---|

TABLE II

| | Analysis and Amounts | | | | | | | | | |
|---|---|---|---|---|---|---|---|---|---|---|
| Location | M | N | O | P | Q | R | S | T | U | V |
| $H_2$ (Vol %) | 38.95 | 38.95 | — | — | 36.77 | 36.77 | 44.55 | 55.43 | 56.5 | 36.77 |
| CO (Vol %) | 20.83 | 20.83 | — | — | 44.34 | 44.34 | 28.61 | 35.60 | 34.85 | 44.34 |
| $CO_2$ (Vol %) | 17.51 | 17.51 | — | — | 7.71 | 7.71 | 18.34 | 3.0 | 3.0 | 7.71 |
| $H_2O$ (Vol %) | 20.49 | 20.49 | — | — | 10.32 | 10.32 | 7.72 | 5.08 | 4.68 | 10.32 |
| $CH_4$ (Vol %) | 1.21 | 1.21 | — | — | 0.09 | 0.09 | 0.09 | 0.11 | 0.10 | 0.09 |
| $N_2$ (Vol %) | 1.01 | 1.01 | 0.5 | — | 0.77 | 0.77 | 0.70 | 0.87 | 0.87 | 0.77 |
| C (kg) | — | — | — | 300 | — | — | — | — | | |
| $O_2$ (Nm³/h) | — | — | 99.5 | — | — | — | — | | | |
| M (Nm³/h) | 1952 | 1952 | 150 | — | 2554 | 2345.0 | 2600.2 | 1994.3 | 1994.3 | 208.97 |
| T (°C.) | 460 | 1100 | 400 | 20 | 980 | 300 | 400 | 70 | 900 | |
| P (bar) | 5.0 | 4.5 | | | 4.3 | | | | | |
| | 413.8 | 413.8 | | | 713.8 | | 655.6 | 413.8 | 313.8 | 58.4 |

According to FIG. 1, a gasifying reactor 9 is supplied with carbon in the form of coal dust over line D. The carbon may also be supplied in the form of a gas or oil, however. Further supplied into reactor 9 is reaction gas over line 6, which is namely a branched-off partial stream of the gas produced in reactor 9. The composition of the reaction gas is given in Table I, column B.

With the use of coal dust as the carbon carrier, the produced ash is withdrawn at the bottom of reactor 9, over line 28 and the produced gas escapes from the reactor at a high temperature over line 34. Some ash can be recycled to reactor 9 over line 29. The composition of the produced gas may be learned from column E of Table I. The produced gas then passes into a heat exchanger and fly ash separator 11 where it is cooled. Therefrom the gas is directed through a cyclone 14 or another suitable device for effecting a complete separation from residual fly ash, and a filter 15 to a converter 17 where water is added, under the conditions of column K of Table I. The gas then passes through a heat exchanger which is connected to steam generator 30 and there the gas is cooled from 400° C. to 150° C. (Conditions G to H). Now a partial stream of the gas under conditions indicated in Column I of Table I is branched off, to be passed through a compressor and then again into waste heat exchanger 11 where it is heated and becomes the already mentioned reaction gas. Conditions of the reactor gas are indicated in column B of Table I. This reaction gas is then supplied to gasifying reaction 9 as one of the basic reactants over line 6 and the respective branch circuit is closed.

The gas portion which has not been branched off the main circuit of reactor 9 is directed through a quenching tower 19 to a CO₂ and H₂S scrubber 22, to be discharged as carburated gas or synthesis gas having properties according to column L of Table I.

The fly ash, after separating residual carbon, may be removed as waste, with the obtained carbon being recycled into reactor 9.

Other conditions from Table I appear at the labeled lines in FIG. 1.

As shown in FIG. 1, reactor 9 includes an inner tube 32 which is coaxial with an outer shell 31. Supply inlets C (for O₂), 6 and D are provided at the upper end of the tube 32 and the lower end portion of the tube is bent radially outwardly toward reactor shell 31 at flanges 33. A bottom space is defined at the lower end of inner tube 32 and by the lower end of shell 31 which is connected to ash discharge lines 28. Gas outlet 34 is provided in the upper portion of the reactor shell 31 as shown.

According to FIG. 2, the method may directly be applied to the operation of a reduction reactor, for example for a direct deoxidation of an iron ore to sponge iron. In this application, the gasifying reactor is operated in the same way as described in connection with FIG. 1. Thus, reactor 9 is supplied through a line 8 with carbon at room temperature, and through a line 7 with oxygen, while the recycled reactor gas is supplied through a line 16. The gas produced in reactor 9 passes through a line 10 into waste heat exchanger 11 where it is cooled and where the substantial amount of fly ash is separated over line 12. The gas stream continues over line 13 to cyclone 14. After having passed through cyclone separator 14 and filter 15, or another suitable equipment for separating solid particles, a part of the gas stream is branched off over line 46 into a heater 3 where the gas flowing back to gasifier reactor 9 (from a reactor 1) is heated to the needed reaction gas temperature of about 1,100° C. The reaction gas composition in line 16 is given in column N of Table II. Ash is collected at outlet 25 of cyclone 14.

The gas which has not been branched off to heater 3 is supplied into high-temperature converter 17 and therefrom through quenching tower 19 and over line 20 to a compressor 21 into CO₂-H₂S scrubber 22, to pass through a line 23 back to waste heat exchanger 11 where it is heated to a temperature of about 900° C. The composition of the gas at that point (line 24) is given in column U of Table II. This reaction gas is then directed into reduction reactor 1 over the line 24 and reactor 1 is supplied at 27 with ore and where, in a continuous process, the ore is deoxidized, with the reduced product being removed at 26. The gas leaves reactor 1 with a composition according to column M of Table II and, after the already mentioned heating in heater 3, is recycled to reactor 9. As a matter of course, the high-grade waste gas energy available in waste gas heater 3 may be utilized in an oxygen preheater 4 and a steam generator 5. A heating of the oxygen improves the operation of the reactor 9.

As is evident, no cooling is provided in either of the described circuits, which would not return the recuperated energy into the circuit again. An optimum efficiency of the described circuits is therefore achieved, and since coal is provided as the supplied carbon carrier, the inventive method may be applied with particular advantage under conditions where the use of oil or natural gas is unsuitable. Therefore, the disclosed method appears to be the ideal solution to the underlying problems.

Some reference numerals and letters designate elements and conditions in the drawings as follows:

1 ore reduction reactor
M waste gas from the reactor (t=400° to 500° C.)
3 waste gas heater
4 oxygen preheater
5 steam generator (steam for $CO_2$ scrubber and converter)
N heated waste gas (t=1000° to 1100° C.)
O preheated oxygen (t—400° C.)
P carbon (coal dust, 0.5 mm dry ground)
9 gasifying reactor
Q gas from the gasifying reactor (crude gas)
11 waste heat exchanger
12 flue dust from the gasifying reactor
13 gas from the waste heat exchanger
14 cyclone separator
15 filter
V fuel gas
17 high temperature converter
S gas after conversion
19 quenching tower and separator drum
20 cooled gas
21 compressor
22 $CO_2$ scrubber—$H_2S$ scrubber (combination, such as Benfield)
T reduction gas (cooled)
U reduction (hot)
25 fly dust outlet
26 product from ore reduction
27 ore supply
28 ash from gasifying reactor While specific embodiments of the invention have been shown and described in detail to illustrate the application of the principles of the invention, it will be understood that the invention may be embodied otherwise without departing from such principles.

What is claimed is:

1. A method of operating a synthesis gas reactor for producing synthesis gas comprising:

supplying carbon containing material, oxygen gas and recycled gas to the synthesis gas reactor for producing a hot raw reactor gas;

supplying the hot raw reactor gas to a waste heat exchanger to heat the waste heat exchanger and cool the raw reactor gas;

removing ash from the cool raw reactor gas to produce ash-free raw reactor gas;

supplying a portion of the free-ash raw reactor gas to a recycled gas heater for operating the recycled gas heater to heat recycled gas;

branching off another portion of the ash-free raw reactor gas from the portion which was passed to the recycled gas heater;

converting the other branched off portion of the ash-free raw reactor gas in a high temperature converter to form converted reactor gas;

compressing the converted reactor gas and supplying it to a scrubber to form cool reduction gas;

passing the cool reduction gas through the waste heat exchanger to form hot reduction gas;

supplying ore and the hot reduction gas to a reduction reactor to form a reduction product and to form said recycled gas for said synthesis gas reactor; and passing the recycled gas through the recycled gas heater after the recycled gas leaves the reduction reactor and before the recycled gas is supplied to the synthesis gas reactor to heat the recycled gas.

2. A method according to claim 1, including recycling ash removed from the cool raw reactor gas, to the synthesis gas reactor.

3. A method according to claim 2, including passing the oxygen gas through the recycled gas heater to heat the oxygen gas before it is supplied to said synthesis gas reactor.

* * * * *